US012668109B2

(12) United States Patent
Che et al.

(10) Patent No.: US 12,668,109 B2
(45) Date of Patent: Jun. 30, 2026

(54) CONCEALED EXTERIOR BELTLINE MOLDING AND VEHICLE HAVING SAME

(71) Applicants: ZHEJIANG ZEEKR INTELLIGENT TECHNOLOGY CO., LTD., Ningbo (CN); ZHEJIANG GEELY HOLDING GROUP CO., LTD., Hangzhou (CN)

(72) Inventors: Weimin Che, Ningbo (CN); Xianghui Lin, Ningbo (CN); Liang Ji, Ningbo (CN)

(73) Assignees: Zhejiang Zeekr Intelligent Technology Co., Ltd., Ningbo (CN); Zhejiang Geely Holding Group Co., Ltd., Hangzhou (CN)

( * ) Notice: Subject to any disclaimer, the term of this patent is extended or adjusted under 35 U.S.C. 154(b) by 0 days.

(21) Appl. No.: 18/958,860

(22) Filed: Nov. 25, 2024

(65) Prior Publication Data

US 2025/0083508 A1     Mar. 13, 2025

Related U.S. Application Data

(63) Continuation of application No. PCT/CN2023/095911, filed on May 23, 2023.

(30) Foreign Application Priority Data

May 24, 2022    (CN) .......................... 202210570239.7

(51) Int. Cl.
*B60J 10/75*        (2016.01)
*B60J 10/32*        (2016.01)
(52) U.S. Cl.
CPC .............. *B60J 10/75* (2016.02); *B60J 10/32* (2016.02)

(58) Field of Classification Search
CPC ....................................................... B60J 10/75
See application file for complete search history.

(56) References Cited

U.S. PATENT DOCUMENTS 1,641,157 A * 9/1927 Cook ....................... B60J 10/75
                                                                      49/377
2,913,783 A * 11/1959 Bright ...................... B60J 10/75
                                                                      49/377

(Continued)

FOREIGN PATENT DOCUMENTS

CN        102442184 A     5/2012
CN        109383249 A     2/2019

(Continued)

OTHER PUBLICATIONS

International Search Report and Written Opinion dated Aug. 6, 2023 for International Application No. PCT/CN2023/095911.

(Continued)

*Primary Examiner* — Catherine A Kelly

(57)                    ABSTRACT

Provided are a concealed exterior beltline molding, and a vehicle having same. The exterior beltline molding is configured to be assembled between a side door assembly and a window glass of the vehicle. When assembled on the vehicle, the exterior beltline molding has a highest point lower than an upper edge of a side door exterior plate. The exterior beltline molding includes a main body, a sealing lip and a glass abutting lip. The main body is configured to be fixedly connected to a side door interior plate of the vehicle. The sealing lip is configured to abut against the side door interior plate to seal a gap between the side door interior plate and the window glass of the vehicle. The glass abutting lip is configured to abut against the window glass of the vehicle.

10 Claims, 5 Drawing Sheets

(56)                References Cited

U.S. PATENT DOCUMENTS

| | | | | |
|---|---|---|---|---|
| 3,203,059 A * | 8/1965 | Becker | ...................... | B60J 10/75 |
| | | | | 24/336 |
| 3,359,688 A * | 12/1967 | Kondolf | .................. | B60J 10/75 |
| | | | | 49/490.1 |
| 4,330,959 A * | 5/1982 | Nishikawa | ............... | B60J 10/75 |
| | | | | 49/377 |
| 4,481,736 A * | 11/1984 | Norton | ..................... | B60J 10/75 |
| | | | | 49/377 |
| 4,744,173 A * | 5/1988 | Mesnel | .................... | B60J 10/74 |
| | | | | 49/377 |
| 5,339,488 A * | 8/1994 | Maass | .................... | B60J 10/248 |
| | | | | 15/250.19 |
| 5,495,693 A * | 3/1996 | Tiesler | ...................... | B60J 1/17 |
| | | | | 296/146.3 |
| 11,938,792 B2 * | 3/2024 | Filipczak | ................. | B60J 10/75 |
| 12,280,641 B2 * | 4/2025 | Choi | ........................ | B60J 10/75 |
| 2012/0297726 A1 * | 11/2012 | Ellis | ......................... | B60J 10/75 |
| | | | | 52/716.7 |
| 2014/0203583 A1 | 7/2014 | Yoshimoto | | |
| 2017/0129318 A1 * | 5/2017 | Uemura | ................... | B60J 10/79 |
| 2018/0072141 A1 * | 3/2018 | Shimoda | ................ | B62D 25/02 |
| 2019/0061503 A1 * | 2/2019 | Filipczak | ............... | B60J 1/2097 |
| 2023/0118935 A1 * | 4/2023 | Warmington | .......... | B60J 5/0468 |
| | | | | 49/493.1 |
| 2024/0351412 A1 * | 10/2024 | Tobon | ...................... | B60J 10/75 |

FOREIGN PATENT DOCUMENTS

| | | | | |
|---|---|---|---|---|
| CN | 111117190 A | 5/2020 | | |
| CN | 216139791 U | 3/2022 | | |
| CN | 114347768 A | 4/2022 | | |
| CN | 114368266 A | 4/2022 | | |
| CN | 216231623 U | 4/2022 | | |
| CN | 114932794 A | 8/2022 | | |
| DE | 102006009386 A1 | 9/2007 | | |
| DE | 102015014819 A1 | 5/2016 | | |
| FR | 3051731 A1 * | 12/2017 | .............. | B60J 10/75 |
| JP | 2016147520 A | 8/2016 | | |
| WO | WO-2019207218 A1 * | 10/2019 | .............. | B60J 10/36 |

OTHER PUBLICATIONS

The First Office Action dated Dec. 31, 2024 for Chinese Application No. 202210570239.7.

* cited by examiner

CONCEALED EXTERIOR BELTLINE MOLDING AND VEHICLE HAVING SAME

CROSS-REFERENCE TO RELATED APPLICATIONS

The present patent application is a continuation of International Application No. PCT/CN2023/095911, filed on May 23, 2023, which claims priority to Chinese patent application No. 202210570239.7, entitled "Concealed Exterior Beltline Molding and Vehicle Having Same", and filed with the China National Intellectual Property Administration on May 24, 2022 by the applicants named Zhejiang ZEEKR Intelligent Technology Co., Ltd. and Zhejiang Geely Holding Group Co., LTD. Both of the aforementioned applications are hereby incorporated by reference in their entireties.

TECHNICAL FIELD

The present application specifically relates to a concealed exterior beltline molding, and a vehicle having same.

BACKGROUND

The exterior beltline molding is generally installed at a beltline of a door of a vehicle, which is mainly configured to cut off water droplets, water mist and dusts on a glass surface when the window glass of the vehicle is regulated, to ensure sound insulation and air tightness of the vehicle, and to support the window glass during the regulation of the window glass of the vehicle. In related technologies, the exterior beltline molding generally has a structure exposed outside a side door exterior plate. The structure will affect aesthetics of the vehicle and thus affect product competitiveness. Meanwhile, in some types of vehicles, in order to ensure the aesthetics of this exposed structure, metal trim strips are often provided by engineers on this structure of the exterior beltline molding, which will undoubtedly increase costs of the entire vehicle unnecessarily.

SUMMARY

In view of this, an object of the present application is to provide a concealed exterior beltline molding and a vehicle having the same.

The exterior beltline molding provided by the present application is configured to be assembled between a side door assembly and a window glass of the vehicle; when assembled on the vehicle, the exterior beltline molding has a highest point lower than an upper edge of a side door exterior plate; the exterior beltline molding includes a main body, a sealing lip and a glass abutting lip, the main body is configured to be fixedly connected with a side door interior plate of the vehicle, the sealing lip and the glass abutting lip extend from the main body to the side door exterior plate and the window glass of the vehicle respectively, the sealing lip is configured to abut against the side door interior plate to seal a gap between the side door interior plate and the window glass of the vehicle, and the glass abutting lip is configured to abut against the window glass of the vehicle.

The sealing lip includes a first sealing lip and a second sealing lip; the first sealing lip extends from an upper part of the main body toward the side door exterior plate, and is configured to abut against the side door exterior plate at a position lower than the upper edge of the side door exterior plate, and the second sealing lip is disposed below the first sealing lip, extends obliquely from a surface of the main body facing the side door exterior plate toward the side door interior plate, and is configured to abut against the side door interior plate.

In an implementation, the main body is configured to be fixedly connected with the side door interior plate including the first plate member and a second plate member, the sealing lip is configured to abut against the first plate member, and the main body is configured to be fixedly connected with the second plate member.

The first plate member is fixedly connected with the side door exterior plate and is disposed on a side of the second plate member close to outside of the vehicle; lower parts of the first plate member and the second plate member are fitted with each other, and upper ends of the first plate member and the second plate member extend toward a direction in which the side door exterior plate is disposed and a direction in which the window glass is disposed, respectively.

In an implementation, the glass abutting lip includes a first abutting lip, the first abutting lip is spaced apart from the first sealing lip and extends from the upper part of the main body toward the window glass; the first abutting lip is configured to abut against the window glass, and is configured to cooperate with the main body and the first sealing lip to seal a gap between the side door exterior plate and the window glass.

In an implementation, the exterior beltline molding further includes an assembly lip, where the main body is U-shaped, and the main body is configured to be clamped to the second plate member with an opening facing downwards; the assembly lip extends from an inner side wall toward another inner side wall opposite to the inner side wall inside the main body, and the assembly lip is configured to abut against the second plate member extending into the main body.

In an implementation, an end cap and an extension rib are provided at an end of the main body, the end cap is integrated with the main body by injection molding, the extension rib is integrated with the end cap by injection molding, and the extension rib is integrated with the main body by injection molding; the extension rib has two forms including a transverse rib and a longitudinal rib.

In an implementation, the end cap includes a front end cap and a rear end cap respectively located on a front end and a rear end of the main body.

A cross section of the front end cap is provided in a shape capable of occluding the front end of the main body, and on a surface of the front end cap that is in contact with the main body, the front end cap is integrated with the longitudinal rib provided on an outer side surface of the main body and is further integrated with the longitudinal rib provided on an inner side surface of the main body; a cross section of the rear end cap is provided in a shape capable of occluding the rear end of the main body, and on a surface of the rear end cap that is in contact with the main body, the rear end cap is integrated with the longitudinal rib provided on the inner side surface of the main body and is further integrated with the longitudinal rib provided on the outer side surface of the main body; or the cross section of the front end cap is provided in a shape capable of occluding the front end of the main body, and on the surface of the front end cap that is in contact with the main body, the front end cap is integrated with the longitudinal rib provided on the outer side surface of the main body and is further integrated with the longitudinal rib provided on the inner side surface of the main body; the cross section of the rear end cap is provided in a shape capable of occluding the rear end of the main body, and on the surface of the rear end cap that is in contact with the main body, the rear end cap is integrated with the longitudinal rib provided on the inner side surface of the main body and is further integrated with the longitudinal rib provided on the outer side surface of the main body; the longitudinal rib is further connected with the transverse rib that is connected with the outer side surface of the main body.

The present application further provides a vehicle, including the concealed exterior beltline molding according to any one as above, and the vehicle further includes a side door exterior plate and a side door interior plate; the side door interior plate includes a first plate member and a second plate member, and the first plate member is fixedly connected to the side door exterior plate and is disposed on a side of the second plate member close to outside of the vehicle; lower ends of the first plate member and the second plate member are fitted with each other, an upper end of the first plate member and an upper end of the second plate member extend toward a direction in which the side door exterior plate is provided and a direction in which a window glass of the vehicle is provided, respectively; the first plate member is fixedly connected to the side door exterior plate, and the second plate member is fixedly connected to the main body.

In an implementation, the upper end of the second plate member is disposed between the first plate member and the window glass of the vehicle, and the upper end of the first plate member extends into a slot provided on an upper part of the side door exterior plate; the slot is formed by bending an upper edge of the side door exterior plate toward a side of interior of the vehicle, and the sealing lip abuts against the slot.

In an implementation, a first angle $\alpha$ is formed between portions of the first plate member and the second plate member close to a connecting position of the first plate member and the second plate member, and a second angle $\gamma$ is formed between the side door exterior plate and the sealing lip; both the first angle $\alpha$ and the second angle $\gamma$ are acute angles.

In an implementation, the first plate member is provided with a boss, the boss protrudes toward interior of the vehicle and is configured to abut against the sealing lip.

To sum up, the exterior beltline molding with no position higher than the side door exterior plate is provided, and the exterior beltline molding includes the sealing lip and the glass abutting lip, where the glass abutting lip is configured to contact the window glass of the vehicle to ensure that water cutting, dust cutting, sealing and sound insulation functions of the exterior beltline molding are realized; and the sealing lip is configured to abut against the side door interior plate to seal a space between the side door interior plate and the exterior beltline molding of the vehicle. The present application can provide a concealed exterior beltline molding, which will be concealable below the side door exterior plate during daily use of the vehicle, to achieve the purpose of protecting the vehicle from being aesthetically affected by the appearance of the exterior beltline molding; further, since not being exposed out of the side door exterior plate, the concealed exterior beltline molding in the present application does not need a design of decorative bright strips, which can reduce the manufacturing, research and development costs of the exterior beltline molding and improve product competitiveness; further, vehicles using this exterior beltline molding have an appearance that is different from vehicles with an exposed exterior beltline molding, which can further provide a diversified choice for designing the outward appearance and styling of the vehicles.

The above description is only an overview of the technical solutions of the present application. In order to have a clearer understanding of the technical means of the present application to be implemented according to the contents of the specification, and in order to make the above and other objects, features and advantages of the present application more obvious and understandable, preferred embodiments, together with the accompanying drawings, are illustrated in detail as follows.

EXPLANATION OF REFERENCE SIGNS

1—Exterior beltline molding, 11—Frame, 12—Main body, 13—Assembly lip, 14—Glass abutting lip, 141—First abutting lip, 142—Second abutting lip, 15—Sealing lip, 151—First sealing lip, 152—Second sealing lip, 16—First give-way area, 17—Second give-way area, 18—Third give-way area, 19—End cap, 191—Front end cap, 192—Rear end cap, 2—Side door assembly, 21—Side door exterior plate, 211—Slot, 22—Side door interior plate, 221—First plate member, 2211—Boss, 222—Second plate member, 3—Window glass of vehicle, 31—Front quarter window glass, 32—Side door glass, 4—A—pillar guide rail, 5—B—pillar trim plate, 6—Flocking, 7—Extension rib, 71—Transverse rib, 72—Longitudinal rib;
A—Separation point.

DESCRIPTION OF EMBODIMENTS

Specific implementations of the present application will be described in further detail below with reference to the accompanying drawings and embodiments. The following embodiments are used to illustrate the present application, but are not intended to limit the scope of the present application.

The terms "first", "second", etc. in the specification and claims of the present application are used to distinguish similar objects and are not necessarily used to describe a specific order or sequence.

Figure 1:
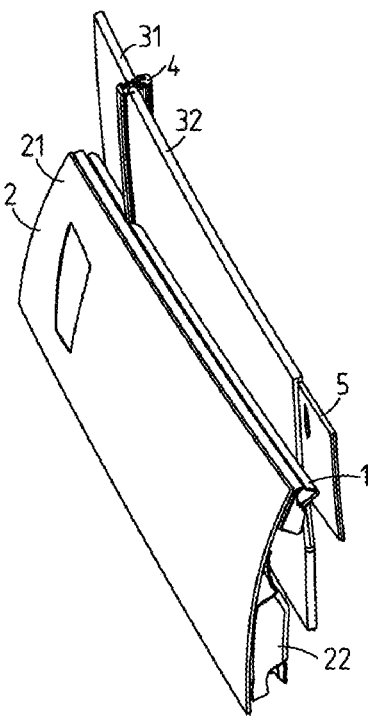
FIG. 1 is a schematic diagram (from a first perspective) of part of structures of a vehicle according to an embodiment of the present application.
Figure 2:
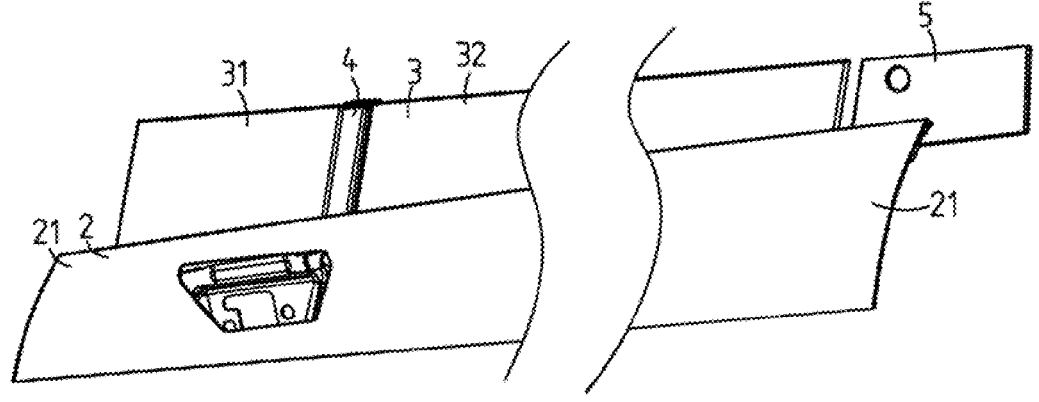
FIG. 2 is a schematic diagram (from a second perspective) of part of structures of the vehicle according to an embodiment of the present application.

As shown in FIG. 1, this embodiment provides part of structures of a vehicle. The left front part of the vehicle is provided with an exterior beltline molding 1, a side door assembly 2, window glass 3, an A-pillar guide rail 4, and a B-pillar trim plate 5. The window glass 3 includes front quarter window glass 31 and side door glass 32. The front quarter window glass 31, the A-pillar guide rail 4, the side door glass 32 and the B-pillar trim plate 5 are provided in sequence from front to rear and are all located on an inner side of the side door assembly 2. A rear part of the front quarter window glass 31 and the side door glass 32 are respectively embedded in the A-pillar guide rail 4, and the side door glass 32 is spaced apart from the B-pillar trim plate 5. Specifically, the exterior beltline molding 1 is disposed between the side door assembly 2 and four parts (the front quarter window glass 31, the A-pillar guide rail 4, the side door glass 32 and the B-pillar trim plate 5), and the side door assembly 2 includes an side door exterior plate 21 and a side door interior plate 22. The side door interior plate 22 is fixed on the side door exterior plate 21, the exterior beltline molding 1 is fixed on the side door interior plate 22, and the exterior beltline molding 1 has a highest point lower than an upper edge of the side door exterior plate 21; the exterior beltline molding 1 is concealable below the side door exterior plate 21 during daily use of the vehicle (as shown in FIG. 2), thereby achieving the purpose of protecting the vehicle from being aesthetically affected by the appearance of the exterior beltline molding 1.

Figure 3:
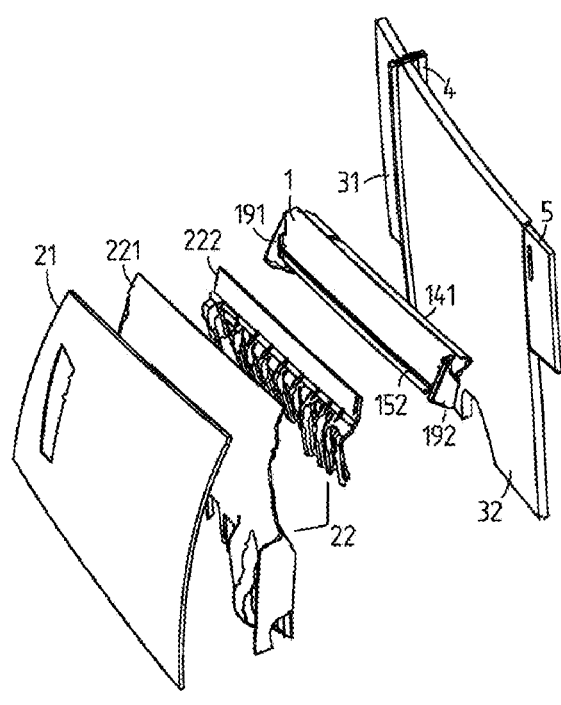
FIG. 3 is an exploded diagram of part of structures of the vehicle according to an embodiment of the present application.
Figure 4:
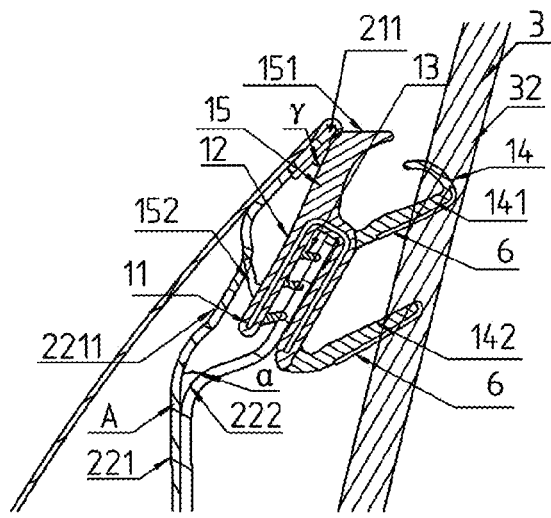
FIG. 4 is a schematic cross-sectional diagram after an exterior beltline molding is assembled on the vehicle according to an embodiment of the present application.

With further reference to FIG. 3 and FIG. 4, in this embodiment, an upper part of an inner surface of the side door exterior plate 21 is provided with a slot 211; the slot 211 is a U-shaped member formed by flanging downward from an upper edge of the side door exterior plate 21. The side door interior plate 22 includes a first plate member 221 and a second plate member 222 connected in a Y shape, where an outer surface of the first plate member 221 is fixedly connected to the side door exterior plate 21 by welding; the first plate member 221 is disposed on an outer side of the second plate member 222, middle and lower parts of the first plate member 221 and middle and lower parts of the second plate member 222 are fitted with each other and connected together by welding; the first plate member 221 and the second plate member 222 are gradually separated from the middle parts to form upper ends spaced apart from each other; the first plate member 221 has a direction extending toward the outside of the vehicle from a separation point A of the first plate member 221 with the second plate member 222. To describe in more detail, the first plate member 221 has a direction extending toward the outside of the vehicle, that is, fitting with the inner surface of the side door exterior plate 21 and then extending into the slot 211. Correspondingly, the second plate member 222 extends obliquely from the separation point A toward the inside of the vehicle, and the upper end of the second plate member 222 is suspended and disposed between the first plate member 221 and the window glass 3 of the vehicle, which is configured to cooperate with the exterior beltline molding 1 so that the exterior beltline molding 1 can be clamped to the side door interior plate 22.

Specifically, the exterior beltline molding 1 includes a metal frame 11 and includes a main body 12, an assembly lip 13, a glass abutting lip 14 and a sealing lip 15 that are made of rubber. The assembly lip 13 is mainly configured to fix the exterior beltline molding 1 to the side door interior plate 22, the glass abutting lip 14 is mainly configured to abut against the window glass 3 to ensure implementation of water cutting, dust cutting, sealing and sound insulation functions of the exterior beltline molding 1 in the related technologies, and the sealing lip 15 is mainly configured to abut against the side door interior plate 22 to further ensure air-tightness and sealing inside the vehicle.

To describe in more detail, the main body 12 is in the form of a strip provided along the front-rear direction of the actual vehicle, and has a U-shaped cross section that is open obliquely downward; the frame 11 is embedded in the main body 12, and has a U-shaped cross section which is open obliquely downward and which is adapted to the main body 12, to ensure the overall strength of the exterior beltline molding 1; the assembly lip 13 is disposed inside the main body 12 and extends from one inner side wall of the U-shaped main body 12 to the other inner side wall of the main body 12; and the assembly lip 13 has a gap with the other inner side wall, and a width of the gap is provided to be slightly smaller than a thickness of the second plate member 222; by this way, when the exterior beltline molding 1 is assembled with the side door interior plate 22, a middle part of the main body 12 is aligned with the second plate member 222 to push the exterior beltline molding 1 from back to front, so that the main body 12 and the second plate member 222 can be interference-fitted; meanwhile, the assembly lip 13 inside the main body 12 is squeezed and then deformed, so that static friction, which is beneficial to assembly stability of the main body 12 and the second plate member 222, is generated between the assembly lip 13 and the second plate member 222, thus the exterior beltline molding 1 is reliably clamped to the side door interior plate 22. It should be noted that the assembly lip 13 is a possible design. In some possible embodiments, no assembly lip 13 may be provided, but the second plate member 222 may be directly interference-fitted with the main body 12 to achieve the purpose of the exterior beltline molding 1 being clamped to the side door interior plate 22.

Based on the above description, in this embodiment, the glass abutting lip 14 includes a first abutting lip 141 and a second abutting lip 142, and the sealing lip 15 includes a first sealing lip 151 and a second sealing lip 152; the first abutting lip 141 and the second abutting lip 142 are disposed on one side of the main body 12, the first sealing lip 151 and the second sealing lip 152 are disposed on the other side of the main body 12, the first abutting lip 141 is disposed above the second abutting lip 142, and the first sealing lip 151 is disposed above the second sealing lip 152. Specifically, the first sealing lip 151 is formed by extending obliquely from an upper left end of the main body 12 toward the outside of the vehicle, and has an approximately cylindrical cross-section; a height of a top end of the first sealing lip 151 in a horizontal direction is lower than a height of the side door exterior plate 21 in the horizontal direction, and a top end surface of the first sealing lip 151 is a plane provided nearly horizontally; the second sealing lip 152 is formed by extending obliquely upward from an outer surface of a lower part of the main body 12, and has a thorn-shaped cross-section; the first abutting lip 141 is formed by extending obliquely from an upper right end of the main body 12 toward the inside of the vehicle and has a hook-shaped cross-section; an opening of the first abutting lip 141 faces the first sealing lip 151, and the first abutting lip 141 and the first sealing lip 151 can be connected to form a U-shaped structure above the main body 12; the second abutting lip 142 is formed by extending obliquely upward from an inner surface of the lower part of the main body 12 and has a thorn-shaped cross-section.

Based on this, when the exterior beltline molding 1 is clamped to the side door interior plate 22, the first abutting lip 141 and the second abutting lip 142 abut against the window glass 3, and the first sealing lip 151 abuts against the slot 211 on an upper part of the side door exterior plate 21; the second sealing lip 152 is disposed between the first plate member 221 and the second plate member 222, and abuts against the first plate member 221; the first sealing lip 151 abuts against the slot 211, such that the exterior beltline molding 1 and the side door exterior plate 21 have a closely fitted part therebetween, and generate static friction, to cooperate with the main body 12 and the first abutting lip 141 to seal the gap between the side door exterior plate 21 and the window glass 3, while to improve the air-tightness and sealing inside the vehicle, thereby ensuring the installation stability of the exterior beltline molding 1 on the side door assembly 2. Further, the second sealing lip 152 abuts against the first plate member 221, which can add a sealing structure between the exterior beltline molding 1 and the side door exterior plate 21 to further ensure the air-tightness and sealing inside the vehicle. Preferably, a first angle α is formed between the first plate member 221 and the second plate member 222, a second angle γ is formed between the slot 211 and the first sealing lip 151, and the first angle α and the second angle γ are both acute angles to ensure that the first sealing lip 151, even without an excessive length, can contact the side door exterior plate 21. More preferably, a boss 2211 for abutting against the second sealing lip 152 is provided on the first plate member 221. The boss 2211 is disposed between the separation point A and the slot 211, and has a direction protruding toward the main body 12, to further reduce the distance between the main body 12 and the first plate member 221, save the material of the second sealing lip 152, and ensure the installation stability of the exterior beltline molding 1 on the side door assembly 2 and the air tightness and sealing inside the vehicle.

In an implementation, surfaces of the first abutting lip 141 and the second abutting lip 142 that are in contact with the window glass 3 are covered with a layer of flocking 6 to reduce a friction coefficient between the first abutting lip 141 (or the second abutting lip 142) and the window glass 3 when the window glass 3 is regulated, to eliminate friction noise.

Figure 5:
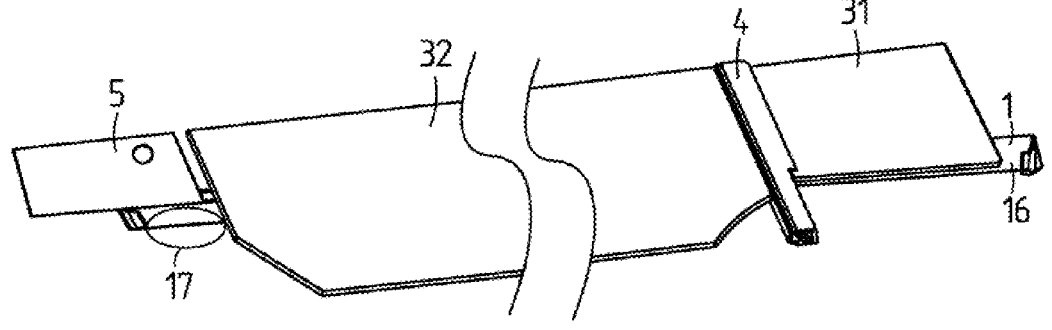
FIG. 5 is a schematic diagram of the exterior beltline molding, a B-pillar trim plate, a side door glass, an A-pillar guide rail and a front quarter window glass being in an assembled state according to an embodiment of the present application.
Figure 6:
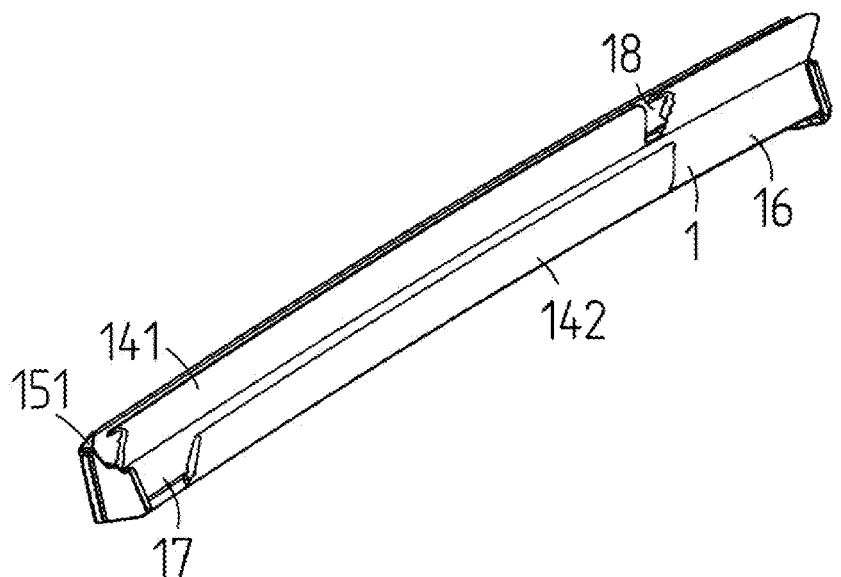
FIG. 6 is a first schematic diagram of the exterior beltline molding according to an embodiment of the present application.

With further reference to FIG. 5 and FIG. 6, on an inner side surface of the exterior beltline molding 1 provided with the first abutting lip 141 and the second abutting lip 142, a lower part of the exterior beltline molding 1 is provided with the second abutting lip 142, and a front end of the second abutting lip 142 is provided with a give-way notch at which a first give-way area 16 is formed, and a rear end of the second abutting lip 142 is provided with a give-way notch at which a second give-way area 17 is formed; there is a third give-way area 18 above a rear end of the first give-way area 16; specifically the third give-way area 18 is a notch provided on a front part of the first abutting lip 141. After the exterior beltline molding 1 in this embodiment is assembled in place on the side door assembly 2, the front end of the exterior beltline molding 1 protrudes forward relative to a front edge of the front quarter window glass 31, and the rear end of the exterior beltline molding 1 is disposed on an inner side of a middle position of the B-pillar trim plate 5. The first give-way area 16 is mainly configured to reserve an installation position for a support bracket of the front quarter window glass 31 (the bracket belongs to the prior art and is not shown in the figures), and a rear end of the first give-way area 16 can cooperate with the third give-way area 18 aligned with the first give-way area 16, to avoid the A-pillar guide rail 4. The second give-way area 17 is mainly configured to avoid other vehicle accessories located on an inner side of the window glass 3 (such as an end joint of an interior beltline molding, not shown in the figures). Obviously, the setting of the give-way areas on the exterior beltline molding 1 can be flexibly adjusted by those skilled in the art as needed.

Figure 7:
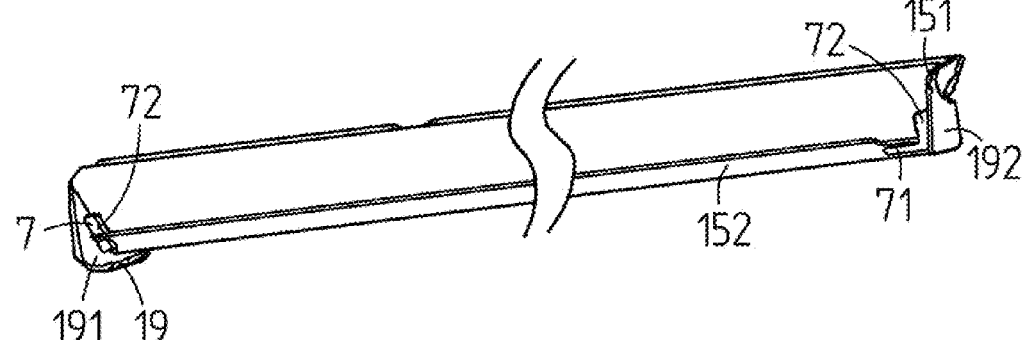
FIG. 7 is a second schematic diagram of the exterior beltline molding according to an embodiment of the present application.
Figure 8:
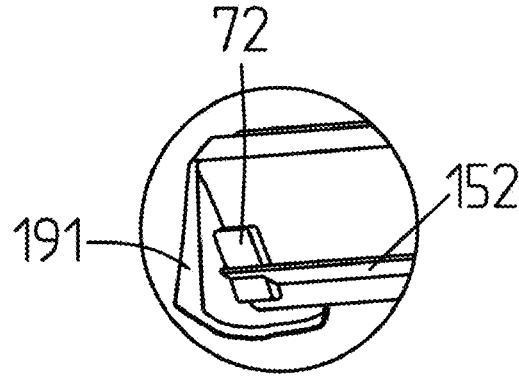
FIG. 8 is a first schematic diagram of a front end cap and an extension rib connected thereto according to an embodiment of the present application.
Figure 9:
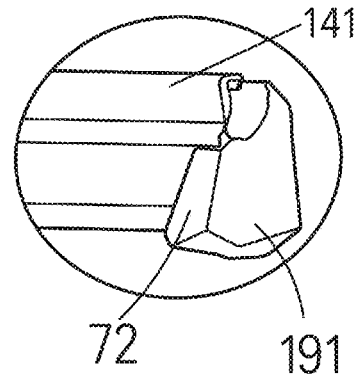
FIG. 9 is a second schematic diagram of the front end cap and the extension rib connected thereto according to an embodiment of the present application.

With further reference to FIG. 7, in this embodiment, an end cap 19 formed by injection molding is provided at an end of the main body 12, and an extension rib 7 connected to the end cap 19 is further provided. The extension rib 7 is integrated with the end cap 19 during injection molding and is also connected to the main body 12 to ensure the reliability of the connection between the end cap 19 and the main body 12. Specifically, the end cap 19 includes a front end cap 191 and a rear end cap 192 respectively located on a front end and a rear end of the main body 12. The extension rib 7 has two forms: a transverse rib 71 and a longitudinal rib 72. In this embodiment, a cross section of the front end cap 191 is configured in a shape capable of occluding the front end of the main body 12, and on a surface of the front end cap 191 that is in contact with the main body 12, the front end cap 191 is integrated with the longitudinal rib 72 provided on an outer side surface of the main body 12 (as shown in FIG. 8), while is integrated with the longitudinal rib 72 provided on an inner side surface of the main body 12 (as shown in FIG. 9), to indirectly increase strength of the connection structure between the front end cover 191 and the main body 12, thereby enhancing the stability of the front end cover 191 on the main body 12.

Figure 10:
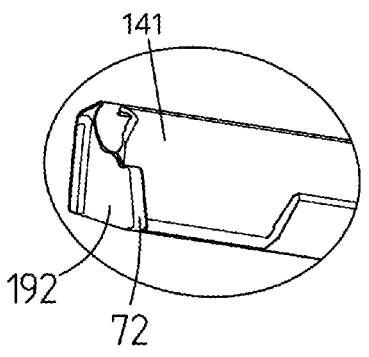
FIG. 10 is a first schematic diagram of a rear end cap and an extension rib connected thereto according to an embodiment of the present application.
Figure 11:
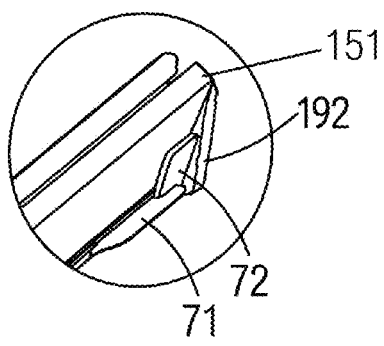
FIG. 11 is a second schematic view of the rear end cap and the extension rib connected thereto according to an embodiment of the present application.

Similarly, as shown in FIG. 10, a cross section of the rear end cap 192 is configured in a shape capable of occluding the rear end of the main body 12, and on a surface of the rear end cap 192 that is in contact with the main body 12, the rear end cap 192 is integrated with the longitudinal rib 72 provided on the inner side surface of the main body 12, and is also integrated with the longitudinal rib 72 provided on the outer side surface of the main body 12 (as shown in FIG. 11), to indirectly increase strength of the connection structure between the rear end cap 192 and the main body 12. Preferably, on the outer side surface of the main body 12, the longitudinal rib 72 is further connected to the transverse rib 71 which connected to the outer side surface of the main body 12, to form the extension rib 7 in combination, thereby further increasing the stability of the rear end cap 192 on the main body 12; in an implementation, in order to avoid increasing the difficulty of the injection molding, the second sealing lip 152 can be provided in a form in which the second sealing lip 152 does not extend to an area where the main body 12 is connected to the transverse rib 71 (as shown in FIG. 7), to avoid the transverse rib 71. Certainly, this avoidance arrangement may not be used, but instead the extension rib 7 may be directly formed around the second sealing lip 152 and connected to the second sealing lip 152 (as shown in FIG. 9); at this moment, a thickness of the extension rib 7 should be less than a length of the second sealing lip 152 extending outward from the surface of the main body 12.

To sum up, the exterior beltline molding 1 with no position higher than the side door exterior plate 21 is provided, and the exterior beltline molding 1 includes the sealing lip 15 and the glass abutting lip 14, where the glass abutting lip 14 is configured to contact the window glass 3 of the vehicle to ensure that the water cutting, dust cutting, sealing and sound insulation functions of the exterior beltline molding 1 are realized, and the sealing lip 15 is configured to abut against the side door interior plate 22 to seal the space between the side door interior plate 22 and the exterior beltline molding 1 of the vehicle. The present application can provide a concealed exterior beltline molding, which will be concealable below the side door exterior plate 21 during daily use of the vehicle, to achieve the purpose of protecting the vehicle from being aesthetically affected by the appearance of the exterior beltline molding. Further, since not being exposed outside the side door exterior plate 21, the concealed exterior beltline molding in the present application does not need a design of decorative bright strips, which can reduce the manufacturing, research and development costs of the exterior beltline molding 1 and enhance product competitiveness. Further, vehicles using this exterior beltline molding 1 have an appearance different from vehicles with an exposed exterior beltline molding, which can further provide a diversified choice for designing the outward appearance and styling of the vehicles.

Only specific embodiments of the present application are described as above, but will not limit the protection scope of the present application. Changes or substitutions readily conceived by any person skilled in the technical field within the technical scope disclosed by the present application should be included within the protection scope of the present application. Therefore, the protection scope of the present application should be subject to the protection scope of the claims.

What is claimed is:

1. A concealed exterior beltline molding, configured to be assembled between a side door assembly and a window glass of a vehicle, wherein when assembled on the vehicle, the exterior beltline molding has a highest point lower than an upper edge of a side door exterior plate; the exterior beltline molding comprises a main body, a sealing lip and a glass abutting lip, the main body is configured to be fixedly connected with a side door interior plate of the vehicle, and the sealing lip and the glass abutting lip extend from the main body to the side door exterior plate and the window glass of the vehicle respectively; the glass abutting lip is configured to abut against the window glass of the vehicle;

the sealing lip comprises a first sealing lip and a second sealing lip; the first sealing lip extends from an upper part of the main body toward the side door exterior plate, and is configured to abut against the side door exterior plate at a position lower than the upper edge of the side door exterior plate; the second sealing lip is disposed below the first sealing lip, extends obliquely from a surface of the main body facing the side door exterior plate toward the side door interior plate, and is configured to abut against the side door interior plate;

wherein the main body is configured to be fixedly connected with the side door interior plate comprising a first plate member and a second plate member, the second sealing lip is configured to abut against the first plate member, and the main body is configured to be fixedly connected with the second plate member;

wherein the concealed exterior beltline molding further comprises an assembly lip;

wherein the main body is U-shaped, and the main body is configured to be clamped to the second plate member with an opening facing downwards; the assembly lip extends from an inner side wall toward another inner side wall opposite to the inner side wall inside the main body, and the assembly lip is configured to abut against the second plate member extending into the main body along the extending direction of the assembly lip;

wherein an end cap and an extension rib are provided at an end of the main body, the end cap is integrated with the main body by injection molding, the extension rib is integrated with the end cap by injection molding, and the extension rib is integrated with the main body by injection molding; the extension rib has two forms comprising a transverse rib and a longitudinal rib.

2. The concealed exterior beltline molding according to claim 1, wherein the first plate member is fixedly connected with the side door exterior plate and is disposed on a side of the second plate member close to outside of the vehicle; lower parts of the first plate member and the second plate member are fitted with each other, and upper ends of the first plate member and the second plate member extend toward a direction in which the side door exterior plate is disposed and a direction in which the window glass is disposed, respectively.

3. The concealed exterior beltline molding according to claim 2, wherein the glass abutting lip comprises a first abutting lip, the first abutting lip is spaced apart from the first sealing lip and extends from the upper part of the main body toward the window glass of the vehicle; the first abutting lip is configured to abut against the window glass of the vehicle, and is configured to cooperate with the main body and the first sealing lip to seal a gap between the side door exterior plate and the window glass.

4. The concealed exterior beltline molding according to claim 1, wherein the end cap comprises a front end cap and a rear end cap respectively located on a front end and a rear end of the main body;

a cross section of the front end cap is provided in a shape capable of occluding the front end of the main body, and on a surface of the front end cap that is in contact with the main body, the front end cap is integrated with the longitudinal rib provided on an outer side surface of the main body and is further integrated with the longitudinal rib provided on an inner side surface of the main body; a cross section of the rear end cap is provided in a shape capable of occluding the rear end of the main body, and on a surface of the rear end cap that is in contact with the main body, the rear end cap is integrated with the longitudinal rib provided on the inner side surface of the main body and is further integrated with the longitudinal rib provided on the outer side surface of the main body; or a cross section of the front end cap is provided in a shape capable of occluding the front end of the main body, and on a surface of the front end cap that is in contact with the main body, the front end cap is integrated with the longitudinal rib provided on an outer side surface of the main body and is further integrated with the longitudinal rib provided on an inner side surface of the main body; a cross section of the rear end cap is provided in a shape capable of occluding the rear end of the main body, and on a surface of the rear end cap that is in contact with the main body, the rear end cap is integrated with the longitudinal rib provided on the inner side surface of the main body and is further integrated with the longitudinal rib provided on the outer side surface of the main body; the longitudinal rib is further connected with the transverse rib that is connected with the outer side surface of the main body.

5. A vehicle, comprising a concealed exterior beltline molding, and further comprising a side door exterior plate and a side door interior plate; wherein the side door interior plate comprises a first plate member and a second plate member; the first plate member is fixedly connected with the side door exterior plate and is disposed on a side of the second plate member close to outside of the vehicle; lower ends of the first plate member and the second plate member are fitted with each other, and upper ends of the first plate member and the second plate member extend toward a direction in which the side door exterior plate is disposed and a direction in which a window glass is disposed, respectively;

the concealed exterior beltline molding is configured to be assembled between a side door assembly and the window glass of the vehicle, wherein when assembled on the vehicle, the exterior beltline molding has a highest point lower than an upper edge of the side door exterior plate; the exterior beltline molding comprises a main body, a sealing lip and a glass abutting lip, the main body is configured to be fixedly connected with the side door interior plate of the vehicle, and the sealing lip and the glass abutting lip extend from the main body to the side door exterior plate and the window glass of the vehicle respectively; the glass abutting lip is configured to abut against the window glass of the vehicle;

the sealing lip comprises a first sealing lip and a second sealing lip; the first sealing lip extends from an upper part of the main body toward the side door exterior plate, and is configured to abut against the side door exterior plate at a position lower than the upper edge of the side door exterior plate; the second sealing lip is disposed below the first sealing lip, extends obliquely from a surface of the main body facing the side door exterior plate toward the side door interior plate, and is configured to abut against the side door interior plate;

wherein the main body is configured to be fixedly connected with the side door interior plate, and the second sealing lip is configured to abut against the first plate member; and the main body is configured to be fixedly connected with the second plate member;

wherein the concealed exterior beltline molding further comprises an assembly lip; the main body is U-shaped, and the main body is configured to be clamped to the second plate member with an opening facing downwards; the assembly lip extends from an inner side wall toward another inner side wall opposite to the inner side wall inside the main body, and the assembly lip is configured to abut against the second plate member extending into the main body along the extending direction of the assembly lip;

wherein an end cap and an extension rib are provided at an end of the main body, the end cap is integrated with the main body by injection molding, the extension rib is integrated with the end cap by injection molding, and the extension rib is integrated with the main body by injection molding; the extension rib has two forms comprising a transverse rib and a longitudinal rib.

6. The vehicle according to claim 5, wherein the glass abutting lip comprises a first abutting lip, the first abutting lip is spaced apart from the first sealing lip and extends from the upper part of the main body toward the window glass of the vehicle; the first abutting lip is configured to abut against the window glass of the vehicle, and is configured to cooperate with the main body and the first sealing lip to seal a gap between the side door exterior plate and the window glass.

7. The vehicle according to claim 5, wherein the end cap comprises a front end cap and a rear end cap respectively located on a front end and a rear end of the main body;

a cross section of the front end cap is provided in a shape capable of occluding the front end of the main body, and on a surface of the front end cap that is in contact with the main body, the front end cap is integrated with the longitudinal rib provided on an outer side surface of the main body and is further integrated with the longitudinal rib provided on an inner side surface of the main body; a cross section of the rear end cap is provided in a shape capable of occluding the rear end of the main body, and on a surface of the rear end cap that is in contact with the main body, the rear end cap is integrated with the longitudinal rib provided on the inner side surface of the main body and is further integrated with the longitudinal rib provided on the outer side surface of the main body; or a cross section of the front end cap is provided in a shape capable of occluding the front end of the main body, and on a surface of the front end cap that is in contact with the main body, the front end cap is integrated with the longitudinal rib provided on an outer side surface of the main body and is further integrated with the longitudinal rib provided on an inner side surface of the main body; a cross section of the rear end cap is provided in a shape capable of occluding the rear end of the main body, and on a surface of the rear end cap that is in contact with the main body, the rear end cap is integrated with the longitudinal rib provided on the inner side surface of the main body and is further integrated with the longitudinal rib provided on the outer side surface of the main body; the longitudinal rib is further connected with the transverse rib that is connected with the outer side surface of the main body.

8. The vehicle according to claim 5, wherein the upper end of the second plate member is disposed between the first plate member and the window glass of the vehicle, and the upper end of the first plate member extends into a slot provided on an upper part of the side door exterior plate; the slot is formed by bending an upper portion of the side door exterior plate toward a side of interior of the vehicle, and the first sealing lip abuts against the upper portion of the side door exterior plate.

9. The vehicle according to claim 5, wherein a first angle $\alpha$ is formed between portions of the first plate member and the second plate member close to a connecting position of the first plate member and the second plate member, and a second angle $\gamma$ is formed between the side door exterior plate and the sealing lip; both the first angle $\alpha$ and the second angle $\gamma$ are acute angles.

10. The vehicle according to claim 5, wherein the first plate member is provided with a boss, the boss protrudes toward the interior of the vehicle and is configured to abut against the second sealing lip.

* * * * *